United States Patent [19]

Ratti

[11] Patent Number: 4,570,680
[45] Date of Patent: Feb. 18, 1986

[54] CONDUCTION OF A CHEMICALLY AGGRESSIVE FLUID

[75] Inventor: Satya P. Ratti, Bad Iburg, Fed. Rep. of Germany

[73] Assignee: Tabel- und Metallwerke Gutehoffnungshuette, Hanover, Fed. Rep. of Germany

[21] Appl. No.: 180,445

[22] Filed: Aug. 22, 1980

[51] Int. Cl.⁴ ............................................... F16L 9/14
[52] U.S. Cl. .................................................. 138/149
[58] Field of Search ............... 138/103, 111, 137, 138, 138/149

[56] References Cited

U.S. PATENT DOCUMENTS

| | | | |
|---|---|---|---|
| 3,269,422 | 8/1966 | Matthews et al. | 138/149 |
| 3,570,545 | 3/1971 | Benteler | 138/149 |
| 4,194,536 | 3/1980 | Stine et al. | 138/149 |

Primary Examiner—Robert I. Smith
Attorney, Agent, or Firm—Ralf H. Siegemund

[57] ABSTRACT

A chemically aggressive fluid e.g. a fluid containing chlorine or a chlorine compound, is conducted through a polytetrafluorethylene tube coated with lead and covered with a thermal insulation wrapping. Other tubes and/or a heating element may be included in the wrapping.

9 Claims, 4 Drawing Figures

4,570,680

CONDUCTION OF A CHEMICALLY AGGRESSIVE FLUID

BACKGROUND OF THE INVENTION

The present invention relates to the conduction of chemically aggressive fluids in a thermally isolated environment.

The chemical, particularly petrochemical, industry requires the conduction of certain chemically aggressive fluids, e.g. between a source of production and an analyzing center or other destination-users (natural gas is quite acidic). The fluid in each instance is conducted through a suitable conduit being, for example, one element in a bundle of conduits; the others, or some of the others, being passed through by a nonaggressive heating fluid. The heating pipes are, for example, made of metal and may have to be quite strong if the heating fluid is pressurized. Alternatively, the conduit, tube, or pipeline for the chemically aggressive fluid may be surrounded by heating means, possibly controlled ones, in order to maintain a particular temperature of the fluid passing through.

Typical examples for such an aggressive fluid may be moist chlorine, HCl gas, phosgene, or others. These substances cannot be conducted through a metal tube, but synthetic materials are required for this purpose. A very useful material here is polytetrafluoroethylene (e.g., Teflon) which can resist these aggressive fluids and is also temperature-resistant.

The invention is based on the discovery that Teflon does have the disadvantage that thin tubes made of this type of material permit gases and vapors to escape by diffusion. This effect could be compensated or impeded by making the walls thicker; nevertheless, some diffusion does and will occur into the tube's wall. If heating elements are embedded, they will be attacked and destroyed gradually, reducing the life of such a conduit.

DESCRIPTION OF THE INVENTION

It is an object of the present invention to overcome the problem outlined above.

It is a particular object of the present invention to provide a new and improved conduit for chemically aggressive fluids.

It is a specific object of the present invention to provide a new and improved conduit for conducting and heating chemically aggressive fluids.

In accordance with the preferred embodiment of the present invention, it is suggested to conduct a chemically aggressive medium through a nonmetallic tube, known per se and resisting the chemical aggression. This tube includes a protective cover, layer, or stratum, which will impede outward diffusion of the aggressive fluid or aggressive components thereof.

In the preferred form and best mode of practicing the invention, the protective cover is to be made of a heat conducting material, e.g. of pure lead or a comparable material which will chemically react to the diffusing gases or vapors, the reactive product then forming the barrier against further diffusion. In the case of any of the abovementioned chlorine-containing fluids, or fluids which include an aggressive chlorine compound, the diffusion barrier will be lead chloride being generated in the interface between the synthetic tube and the lead coating. It was found quite important that the protective cover be free from chlorides.

Preferably, heating means are provided around, or next to, the conduit for a pressure fluid. These heating means may be comprised of electrical heaters or a heating tube or tubes. Even the heating tube or tubes can, if necessary, be protected with a cover of the same material as used for protecting the fluid transporting tube or tubes.

The preferred embodiment of the invention, the objects and features of the invention, and further objects, features and advantages thereof, will be better understood from the following description taken in connection with the accompanying drawings.

DESCRIPTION OF THE DRAWINGS

Proceeding now to the detailed description of the drawings, FIG. 1 shows a tube 1 made, for example, of polytetrafluoroethylene. This tube is coated with a protective layer 2 made of pure lead. The lead layer 2 was preferably extruded onto the tube 1. A heat barrier 3, being comprised of a mesh-like ribbon made of glass fiber, is placed onto layer 2, and several layers of fleece-like material 4 are placed onto the ribbon 3. A flame-retarding layer 5 is provided as an outer cover or jacket made of a synthetic such as thermally highly stable polyvinylchloride, a high-density polyethylene, or of a modified polyethylene classified as self-extinguishing and flame-retarding. Other materials can be used as a flame-retarding cover, as is known in the art.

In operation, hot, aggressive fluid passes through tube 1; there is continuous diffusion into the tube's wall. Any chlorine in that fluid will react with the lead and reinforce the diffusion barrier which the lead itself provides already.

Figure 2:
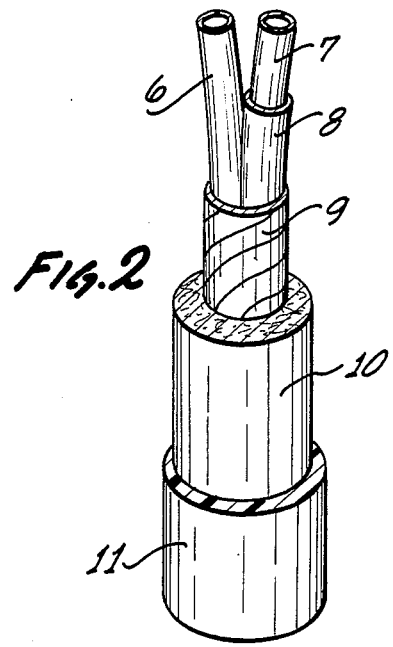
FIG. 2 is a similar view of a two-conduit system.

FIG. 2 illustrates a pair of tubes, 6 and 7, of which tube 6 is a heating tube made, e.g., of a high-grade steel such as stainless steel or copper. Tube 7 is again made of the material known under the trademark Teflon, for conducting the chemically aggressive fluid. Tube 7 is coated with pure lead 8. Both tubes, 6 and 7, are wrapped in a fiberglass mesh ribbon 9 and thermofleece insulation 10. Reference numeral 11 designates the outer, protective cover of, for instance, a flame-retardent, synthetic as described. The two tubes 6 and 7 may run in parallel, but they may be twisted about each other, i.e., stranded, for improving particularly the heating conditions of the fluid in tube 7.

Figure 3:
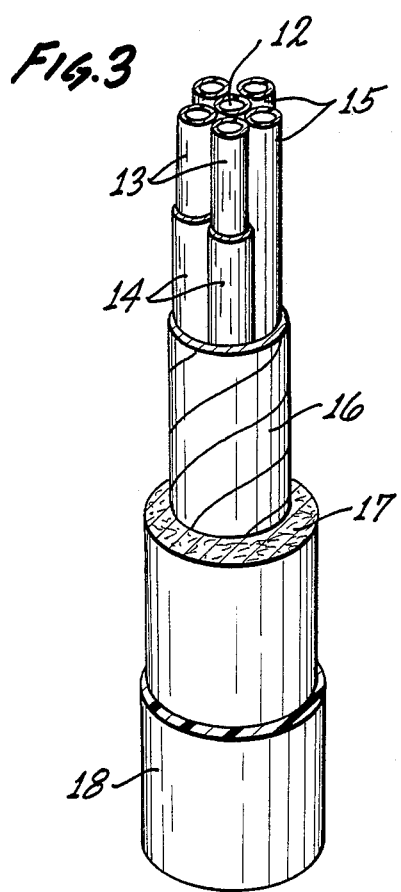
FIG. 3 is a similar view of a tube bundle.

FIG. 3 shows a tube bundle being comprised of tubes 12, 13, and 15. By way of example, the two tubes 13 each conduct a chemically aggressive fluid (it does not have to be the same kind of fluid). These two tubes are individually coated and jacketed by means of a cover 14 of lead, as described. The bundle includes a heating tube 12 and additional tubes 15 which may be, or may include, further heating tubes, but may also conduct other, nonaggressive fluids.

Figure 1:
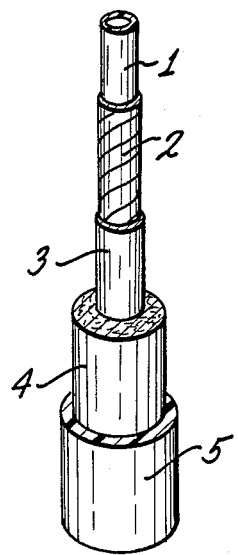
FIG. 1 is a perspective view into a single conduit, showing the various layers thereof, peeled away stepwise in order to expose, respectively, the next layer underneath.

The tube bundle as a whole is wrapped in a ribbon 16 of glass fiber mesh which is covered with a thermofleece insulation 17, and 18 designates a synthetic, protective, flame-retardent outer cover, as described above with reference to FIG. 1. The tube bundle may be stranded together or run in parallel.

Figure 4:
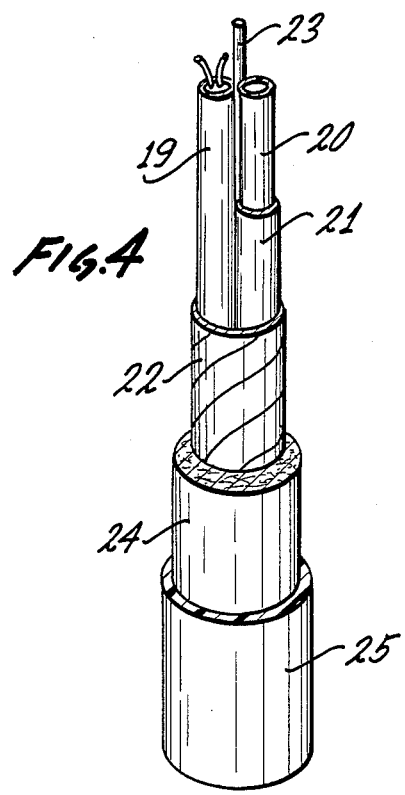
FIG. 4 is a view similar to FIG. 1 or 2, showing a modified heating means for a single conduit.

FIG. 4 illustrates a tube 20 of synthetic material for the conduction of a chemically aggressive fluid and being covered with a diffusion barrier layer 21, as described. An electrical heater 19 is placed alongside tube 20, and the two elements 19 and 20 are wrapped in a common, thermally insulating ribbon 22; layers 24 and 25 are of thermo-fleece and jacket material, as described. However, layer 22 may be a shield or screen of metal, such as aluminum, copper, or high-grade steel. Fleece material 24, however, should remain as a thermo-barrier.

Electric currents may be induced in the metal shield as a result of current flow through the heating element. It is, therefore, advisable to include a conductor such as a bare wire 23, being of solid or stranded configurator and serving as conductor through which these induction currents are drained off the system. The wire 23 must be in conductive contact with the metal shield. Such a protection is particularly needed in case there is the danger of some explosion, or in hazardous areas.

The invention is not limited to the embodiments described above; but all changes and modifications thereof, not constituting departures from the spirit and scope of the invention, are intended to be included.

I claim:

1. A conduit for the conduction of a chemically aggressive fluid, comprising:
   a tube made of a nonmetallic, synthetic material which resists chemical aggression;
   a protective layer on the tube being made of lead and provided for impeding diffusion of the fluid beyond the tube; and
   heat insulation means surrounding said layer.

2. A conduit as in claim 1, the material of the protective cover being free from chlorides.

3. A conduit as in claim 1, including heating means disposed next to the tube as carrying the layer, the heat insulation means at least in parts surrounding also the heating means.

4. A conduit as in claim 3, the heating means being a metal tube for the conduction of heating fluid.

5. A conduit as in claim 3, the heating means being an electrical heater.

6. A conduit system, comprising:
   a first tube made of a nonmetallic, synthetic material which resists chemical aggression;
   a protective layer on the tube being made of lead and provided for diffusion of the fluid beyond the tube;
   at least one further tube for the conduction of a nonaggressive heating fluid; and
   thermal insulation means surrounding the tubes individually or as a bundle.

7. A conduit system as in claim 6, including at least one other tube made of nonmetallic material which resists chemical aggression; and
   a layer on the other tube for impeding diffusion.

8. A conduit system as in claim 6 or 7, at least one further tube being a metal heating tube.

9. A conduit as in claim 1 or 6, the layer being made of a heat-conducting material.

* * * * *

UNITED STATES PATENT AND TRADEMARK OFFICE
CERTIFICATE OF CORRECTION

PATENT NO. : 4,570,680
DATED : Feb. 18, 1986
INVENTOR(S) : Satya P. Ratti

It is certified that error appears in the above-identified patent and that said Letters Patent are hereby corrected as shown below:

The assignee's name on the front page has been misspelled. It should read as follows:

[73] Assignee: Kabel- und Metallwerke
Gutehoffnungshuette, Hannover, Fed.
Rep. of Germany.

Signed and Sealed this

Nineteenth Day of August 1986

[SEAL]

Attest:

DONALD J. QUIGG

Attesting Officer

Commissioner of Patents and Trademarks